Dec. 27, 1938.   H. J. WOOCK   2,141,284
TENSILE TESTING APPARATUS
Filed March 30, 1936   2 Sheets-Sheet 1
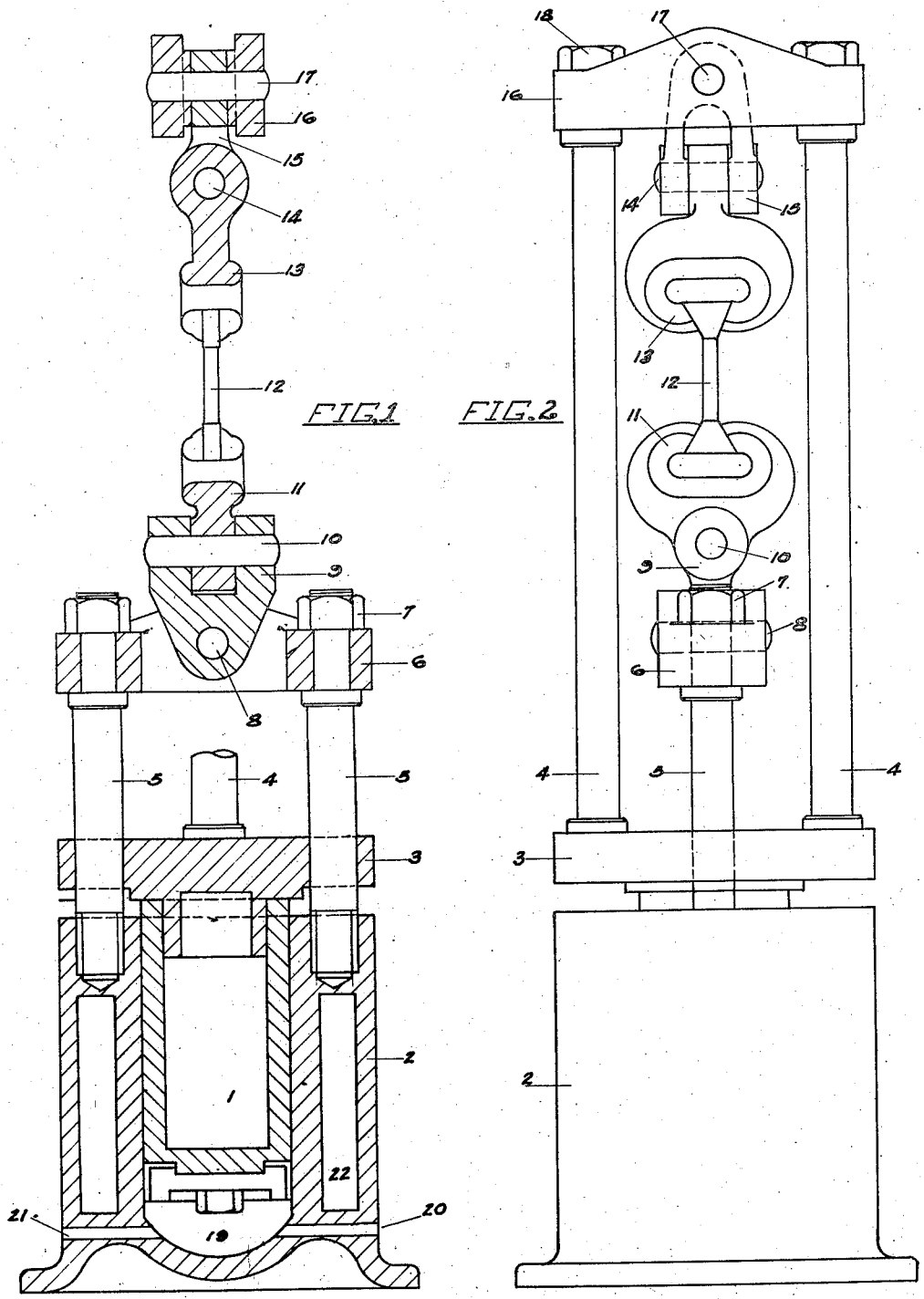
- INVENTOR -
Herbert J. Woock

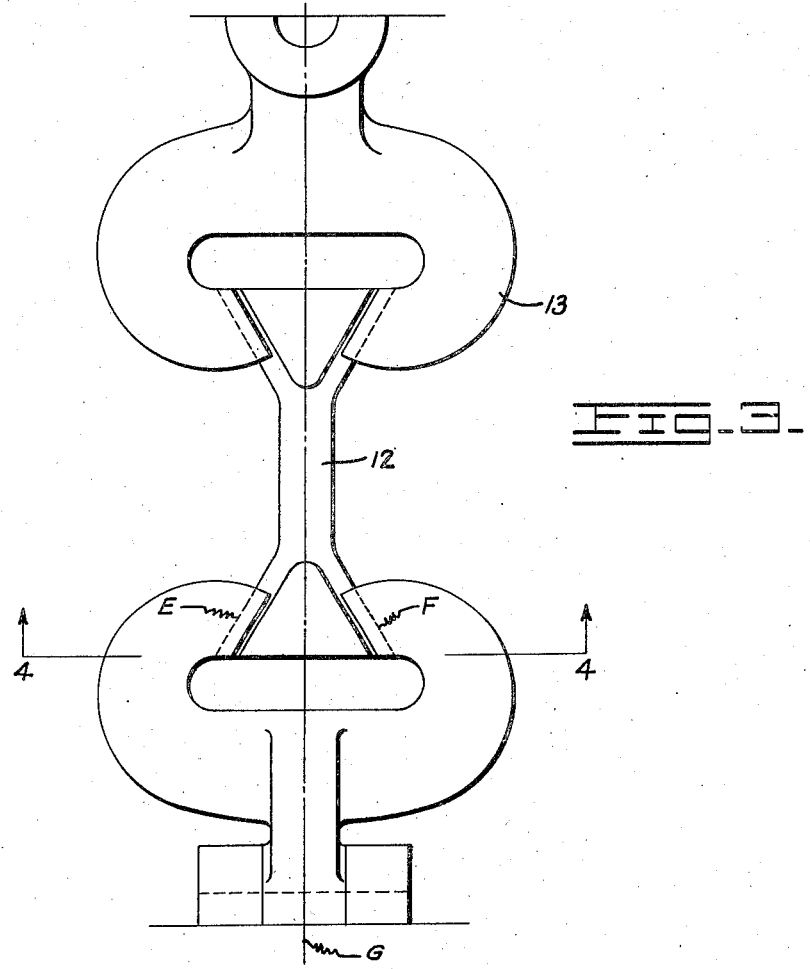

Patented Dec. 27, 1938

2,141,284

UNITED STATES PATENT OFFICE 2,141,284

TENSILE TESTING APPARATUS

Herbert J. Woock, Lodi, Calif.

Application March 30, 1936, Serial No. 71,601

1 Claim. (Cl. 73—51)

My present invention relates to apparatus for testing the physical properties of metals, and especially it relates to improvements in construction of apparatus and test specimens for obtaining the tensile strength, elastic limit and other properties of test bars which are pulled apart.

Heretofore in the testing of test bars specimens of steel, and other metals, to determine the tensile strength, it has been customary to hold the test bar in jaws which are closely aligned in order to avoid any bending pressure or strain on the test bar during the pulling process; and it is customary to machine the specimen all over, both the part which is of uniform cross sectional area and the ends which are usually threaded to be screwed and held in members or bushings which in turn are held in the jaws or gripping wedges of the pulling machine. Where unmachined test bars are tested, they are held in wedge grip jaws which fit into wedge shaped slots of the pulling machine. In both these instances, the test bar proper (in the case of the unmachined bar gripped between wedge grips), and the threaded specimen, there is a rigid holding of the test bar between the two opposing pairs of gripping members. I am aware that so-called spherically adjustable holders are used, one at each end of the threaded specimen, so as to prevent any other than a tension on the bar parallel to its axis, but such design prevents the use of unmachined specimens. Where unmachined specimens have heretofore been used, it has been necessary to depend on accurate alignment to avoid any bending or tendency to bend the unmachined bar. Such is the practice in pulling unmachined malleable test bars. The objection to this method is that inaccuracies in the wedges or bars themselves do result in a bending tendency on the bar as soon as pulling takes place.

My invention aims to provide an improved construction of jaws or holders and test specimen bars to avoid the above objections.

In the testing of steel and similar test bars, the tendency to get out of alignment is so great in machines heretofore used as to require in the standard specifications the use of machined and threaded specimens. The cost of such machining is material. It is usually between $1.00 and $2.00 per specimen and this is so great as to almost prohibit the testing of bars in considerable numbers or regularly as would be done were it possible to test accurately an unmachined cast test bar. Furthermore the cost of having a test bar tested in the usual manner is also expensive, due to the great cost of testing machines as heretofore built. These costs are a great detriment in the case of the small steel or metal maker or foundry although such testing is now becoming almost a vital necessity. Another purpose of my present invention is to provide a construction and design of test bar which can be easily cast without undue casting strains and which can be held or gripped within a specially designed and constructed jaw in a simple, inexpensive and quick manner; this bar being so constructed that the gripping ends have a wedging action in two planes. Therefore, when suspended between two jaws of like construction and in combination with double universal joints this bar will be automatically forced into common central axis, and thereby being pulled absolutely straight. Still another purpose of my invention is to provide for multiple universal joints or a series of universal joints in conjunction with self-centering multiple wedge shaped gripping heads between the opposing supporting members of the pulling machine; and thus make possible an inexpensive and quick means for pulling and testing cast unmachined test bars. One of the objects of my invention, therefore, is a construction of apparatus and specimen which is simple, quick and inexpensive.

Another object of my invention is an improved means for gripping and holding the ends of a rigid test bar in alignment during tension without bending strain, and this object is accomplished by the combination of two universal joints; and the self-centering multiple wedge shaped jaws and test bars. Although my invention is particularly intended for the testing of unmachined test bars, yet a threaded specimen can be screwed into bushings or holders, one at each end, thus constituting in combination with the bar proper a rigid specimen between the holding jaws.

I have discovered that I can make a self-centering or self-aligning test bar combination and that I can pull a test bar in tension, even though the test bar may have irregularities in the wedge shaped end members, and this bar can be tested without objectionable bending strain on the bar during tension as the jaws are moved apart. I have discovered that I can pull a test bar while held in two clamping or wedge shaped jaws, each of which jaws is mounted with a universal joint (having two pins at right angles) between that jaw and the fixed or movable head members through which tension is applied. I have found that with the jaws embodied in my invention there can be unevenness of the surface which is wedged in the wedge shaped jaws, and yet the test bar can be pulled without bending tension on the bar, and this is accomplished by the use of a double universal joint and self-centering jaw combination, one joint at each end of the rigid member. Thus there is provided, by the construction of wedge shaped self-centering jaws and universal joints, a machine construction which makes possible a very inexpensive tensile machine and a test bar which can be cast with a minimum of casting strain and which can be tested as cast without machining. Tests I have made prove definitely that there is a very small difference in results between those I obtain with the apparatus of my present invention and the results obtained by full machined and threaded specimens and, furthermore, it is possible to obtain accurate information of the physical properties of the metal test bar in the apparatus of my present invention so close as to assure ample margin to meet the requirements of tests made by the fully machined and threaded specimen method.

My invention will be better understood by reference to the annexed drawings.

Fig. 1 shows a side view of machine in vertical section with test specimen in place.

Fig. 2 shows a front view of machine with test specimen in place ready to be pulled.

Fig. 3 shows side view of holding jaws and test specimen in place.

Fig. 4 shows sectional view 4—4 of Fig. 3.

I will now describe my invention with reference to the annexed drawings in which the same parts are represented by the same numerals.

Referring to Fig. 1 showing a longitudinal vertical section of my testing machine. 1 shows piston which operates in cylinder 19; 2 shows the housing or frame for machine which contains oil reserve tank 22. 3 shows upper cross head or plate mounted on piston 1 which moves up or down in unison with piston 1. 4 shows connecting rods or support members connecting piston head or plate 3 with cross head 16 which moves up or down in unison with piston 1. These connecting rods are securely fastened to plate 3 and to cross head 16. 5 shows stationary connecting rods which are securely fastened to main body or frame 2 at lower end and securely fastened at upper end to stationary cross head 6. Connecting rods 5 pass through plate 3 with ample clearance to prevent contact or friction. Connecting rods 5 are set at 90 degrees to connecting rods 4 as will readily be seen in drawings. 7 shows heavy nuts which hold rod 5 to cross head 6. 8 shows first pin in universal joint connecting stationary cross head 6 with first link of universal joint 9. 10 shows second pin of universal joint. This pin is at right angles to pin 8 and connects link 9 with link 11 which is also the lower or stationary jaw or holding fixture for test specimen. 12 shows test specimen in place. 13 shows upper or movable jaw or holding fixture for upper end of test specimen. This jaw 13 also forms the first link of the upper universal joint. 14 is first upper pin connecting jaw or link 13 with link 15 which in turn is connected to movable cross head 16 by pin 17 and 14 again are at right angles to one another. 18 show nuts which hold cross head 16 to support member 4.

It will readily be seen that when oil or some other liquid is forced by means of suitable pump from reserve chamber 22 in through pipe 20 into cylinder 19 that this pressure will force piston 1 with plate 3 connecting rods 4 and cross head 16 with upper universal links and holding fixtures 13 upwards.

It will also be understood that as jaws 11 with universal link below cross head and rods are stationary with frame 2 that test specimen between jaws 11 and 13 will be stretched and broken.

Figure 3 shows side view of holding jaws and test specimen in place; more in particular E and F in Figure 3 showing the wedging surfaces of both the test specimen and the holding jaws. It will be readily seen when test specimen 12 is drawn into holding jaws 13 that the test specimen will be forced into central position on plane with central line G.

Figure 4 shows sectional view of Figure 3, section 4—4. This view also shows test specimen in place. Refer to letters A, B, C and D showing wedging surfaces of both test specimen and jaws. It will be readily seen that when the test specimen is drawn into close contact with jaws that surfaces A, B, C and D will force test specimen into central position on plane with center line H. It will be further seen that the center line H is at right angle to center line G and that both of these planes are parallel to the center line or axis of the main body of the specimen 12 which places the test specimen in the exact center of the testing machine.

It will be further understood that whereas there is a double universal joint on either side or end of test specimen in combination with the self-centering multiple wedge shaped specimen and holders, that regardless of any roughness or irregularities on the part of the test specimen that it will always be stretched in perfect alignment with center part of specimen which is to be broken, and thereby prevent any undesirable strains on test specimen.

In explanation of how I arrive at the tensile strength reading of a test specimen or the yield point or elongation, I wish to state that where the square inch area of the cylinder is known, also the area of the test piece, it only requires a pressure gauge attached to the cylinder, which has a stop needle on same which will stay at highest pressure arrived at before test piece broke, and in combination with this gauge a chart giving the pounds tensile strength per square inch to pounds of gauge reading.

For the yield point, it is only necessary to clamp an extensometer on test specimen. When this meter starts to register the operator reads the pressure gauge, giving the yield point.

The elongation is received by the full register of the extensometer at breaking of test specimen.

While this specification sets forth in detail the present construction of the device, still in practice such deviations from such detail may be resorted to as do not form a departure from the spirit of the invention, as defined by the appended claim.

Having so explained my invention, I beg to be granted the word patent on the following claim.

What I claim is:—

In a tensile testing machine having two angularly disposed holding jaws which are so constructed that they will automatically center and hold during the pull a rough casting test specimen; each jaw having opposed multiple wedge shaped gripping surfaces causing wedging action to be in two planes; said planes being at right angles to each other and both being inclined to the main body of the test specimen.

HERBERT J. WOOCK.